Aug. 15, 1933.    J. L. SHANNON    1,922,332
ELECTRIC HAND FLASH LIGHT
Filed March 11, 1930    2 Sheets-Sheet 1
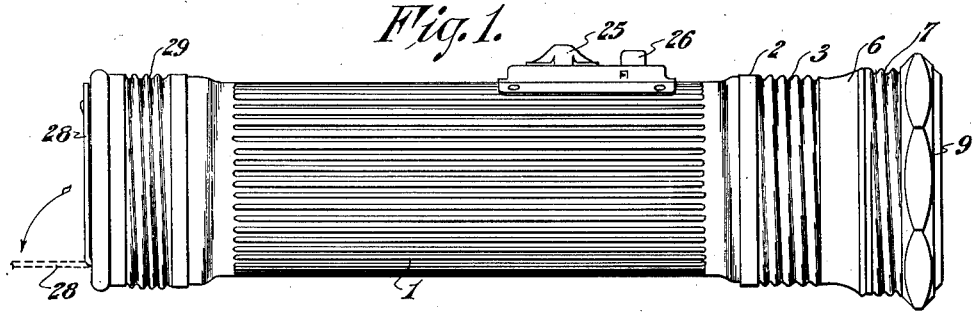
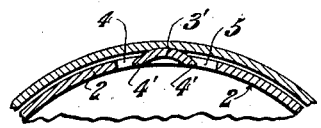
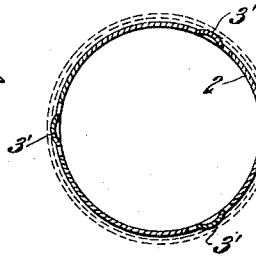
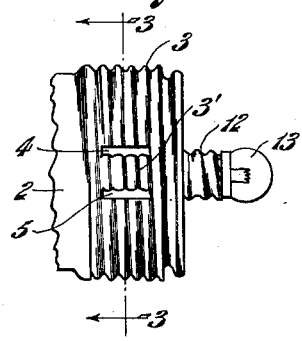
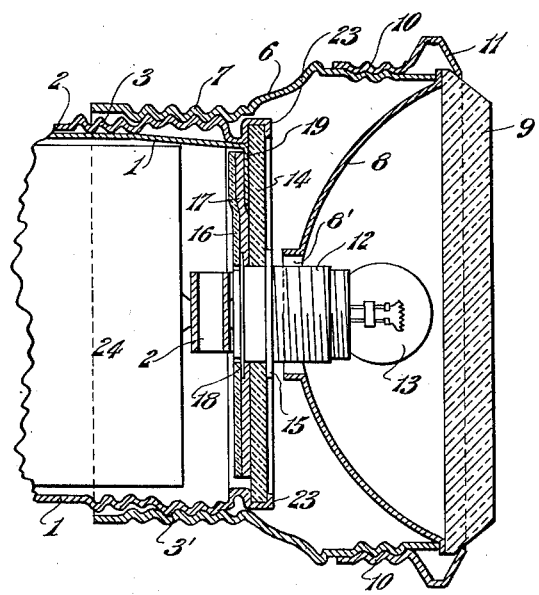
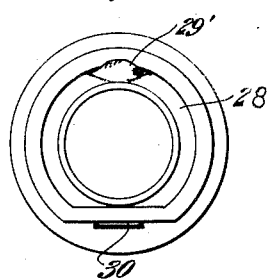
INVENTOR,
James L. Shannon,
BY
Harry W. Bowen.
ATTORNEY.

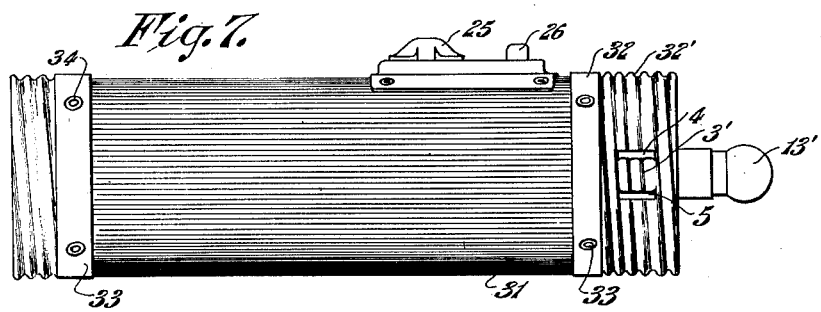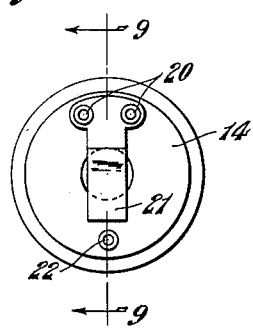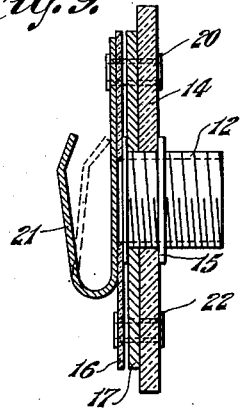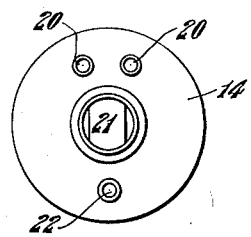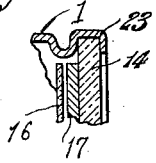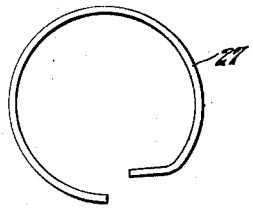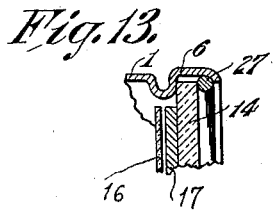

Patented Aug. 15, 1933

1,922,332

UNITED STATES PATENT OFFICE 1,922,332

ELECTRIC HAND FLASH LIGHT

James L. Shannon, Springfield, Mass., assignor, by mesne assignments, to Blake Manufacturing Corporation, Springfield, Mass., a Corporation Application March 11, 1930. Serial No. 434,940

5 Claims. (Cl. 240—10.69)

This invention relates to improvements in flashlights, or as they are sometimes termed, hand lamps, wherein an electric dry cell battery is enclosed in a suitable casing as fibre or metal. The bulb being electrically connected to the battery thru a switch and electric circuits.

An object of the present invention is to provide means for frictionally and adjustably securing the threaded head portion of the lamp onto the casing, when made of either metal or fibre. This head portion carries the usual reflector and the lens. The said securing means comprises broadly, when a metal casing is used, a struck-up portion of the threaded part of the metal casing onto which threaded part of the threaded head is screwed and frictionally retained. When a fibre casing is employed the threaded collar is secured by rivets. This threaded collar is also provided with struck-up threads. These struck-up threads engage the threads of the cap and frictionally retain the lens, reflector, and cap in an adjusted position relative to the focal center of the lamp and reflector for focusing purposes.

Suitable means is provided for retaining the lamp socket on the casing, either by spinning the metal end of the casing around a disk of insulating material or by means of a split ring, as will be fully described.

Referring to the drawings:

Fig. 1 is an elevational view showing the lamp complete with the cap threaded onto the threads of a metal casing.

Fig. 2 is a transverse sectional view thru one of the struck-up threads illustrating the frictional contact between the cap and the threads of the metal casing.

Fig. 3 is a transverse sectional view on the line 3—3 of Fig. 4 showing threads of the casing struck up at different angular portions of the thread, as three.

Fig. 4 is a detail elevational view of the threaded portion of a metal casing illustrating four of the threads being struck-up.

Fig. 5 is an enlarged detail sectional view showing the upper end of the metal casing with the thread formed thereon and illustrating the cap threaded onto the struck-up portions of the threads, also illustrating the means for securing the lamp and its socket to the casing.

Fig. 6 is an end or bottom view of Fig. 1 looking from the left showing the suspending hook which is hingedly secured to the bottom closure cap.

Fig. 7 is a view of the casing in which the batteries are placed and composed of fibre with a threaded collar secured thereto by rivets and illustrating the struck-up portions of several of the threads of the collar.

Fig. 8 is a detail view showing the spring contact with which one pole of the battery engages.

Fig. 9 is an enlarged sectional detail view on the line 9—9 of Fig. 8 illustrating the assembly of the lamp socket relative to the spring contact which engages a pole of the battery.

Fig. 10 is a view of Fig. 9 on a smaller scale looking from the right.

Fig. 11 is an enlarged detail view illustrating the lip on the upper end of the casing, which is spun over for retaining the disk of insulation in place.

Fig. 12 is a detail view of a split ring, and

Fig. 13 is a modification showing the split ring for holding the disk of insulation in the casing.

Referring to the drawings in detail:

1 designates the metallic casing portion of the flash lamp composed of corrugated metal tubing and 2 the threaded portion of the casing. This portion of the casing is formed with threads 3. At spaced distances around the circumference of these threads are openings 4 and 5 between which openings several of the threads are struck up, as shown at 3'. The cap or head portion is indicated as a whole at 6 formed with the threads 7, which engage the threads 3 and the struck-up portions 3' of the threads of the casing. The threads 7 will engage the struck-up threads 3' and serve to frictionally and positively retain the cap 6 in adjustable positions on the portion 2 and also serve for focusing the lamp in the reflector, as will be described.

Located within the cap 6 is the usual polished reflector 8 and the lens 9 which are retained in place with the threaded bezel 10 having the in-turned edge portion 11.

The metallic lamp socket is indicated at 12 and the bulb at 13. The reflector 8 is formed with an opening 8' to receive the lamp socket 12, as shown. This socket is retained in place on the disk of insulating material 14 by means of the metal flange 15 and the disk 17 being metal. Located between the disks 16 and 17 is the metal flange 18, which is secured to the socket 12. 19 is an inwardly extending portion of the electric circuit strip 19' which is connected to the battery.

Referring to Figs. 8, 9, and 10 it will be seen that the lamp socket 12 is firmly secured to the disk of insulation 14 by means of the rivets 20, which rivets serve to secure the spring contact 21 to the disk of insulation. A rivet 22 is also employed for securing the disk 14 and the two disks 16 and 17 together. The spring contact 21 is for the purpose of preventing breakage of the battery when it is dropped into the casing. It prevents shattering the insulation. It may assume the dotted line position.

The upper end of the casing 1 is spun over the disk of insulation 14, as indicated at 23 in the enlarged view of Fig. 5.

This construction permits the reflector 8 to be moved axially of the lamp 13, whereby the lamp may be focused in the reflector and accurately adjusted and secured on the threads 3'. The struck-up portions 3' of the thread 3 will retain the cap 6 in any of its adjusted positions.

It should be noticed that the inner ends 4' of the threads 3' are flush with the inner surface of the casing 2. This avoids any rough edges that would injure the battery. One of the electric cells is indicated in Fig. 5 at 24 and a slidable switch at 25 and push button at 26.

Referring to Fig. 13, 27 designates a split ring for retaining the disk of insulation 14 in place. This ring may, of course, be readily removed. It is illustrated in detail in Fig. 12.

28 designates a ring for supporting the lamp in a hanging position. It is retained in place on the lower cap 29 by means of a frictional snap 29'. The hinge is indicated at 30.

Referring to Fig. 7 in which a fibre casing 31 is indicated, 32 is a threaded collar which is secured to the casing with the rivets 33; the struck-up threads are indicated as before at 3'. It is understood that the threaded cap 6 shown in Fig. 1 is threaded onto the threads 32' of the collar 32, as explained in connection with Figs. 1 and 5.

The mutilated or struck-up threads 3' will frictionally operate to retain the cap 6 in any adjusted position for focusing purposes.

The lower end of the metal casing 1 is formed with threads to receive the threaded closure cap 29. The lower end of the fibre casing 31 has secured thereto the threaded collar 33 by means of the rivets 34.

From this description, it will be seen that I have provided a very simple and inexpensive means for adjustably securing the cap carrying the lens and reflector, whereby the reflector may be accurately adjusted relative to the lamp and properly placed in the focal center of the reflector or in any other desirable position for providing a beam of light or one which extends over a large surface, but not so sharply defined.

What I claim is:

1. Means in an electric hand lamp, having a battery enclosing metal casing formed with threads at each end, an electric bulb, a reflector, and a cap member having unmutilated threads and carrying the reflector, for adjusting and retaining the reflector in any position relative to the electric bulb for focusing purposes, said means comprising slotted and struck-up portions of some of the threads on the casing and which threads are engaged by the said unmutilated threads on the cap member carrying the reflector.

2. In an electric hand lamp, a battery enclosing casing having a threaded portion at one end to adjustably receive a reflector hood, said threaded portion being formed with a plurality of groups of pairs of slots extending across several of the threads, the threaded portions between said slots being located above the curved surface of the main body of said threaded portion.

3. In an electric hand lamp, a battery casing formed with threaded portions at one of its ends for receiving a reflector hood having threads, the threaded portion at the end of said casing which receives the said reflector hood being formed with a plurality of pairs of transverse slots in the threaded portion thereof and which extend across said threads, the threads between said slots being raised above the annular surface of the body of said threads.

4. A focusing flashlight comprising a metallic battery enclosing casing having threaded ends, a bulb secured to the casing, a hood having non-mutilated threads, a reflector secured in the hood, means for frictionally retaining the threaded hood on the metal casing comprising threads formed on the metal casing and co-operating with the threads formed on the hood, the threads formed on the casing being formed with spaced and struck-up portions and slots at each end of each of said struck-up threaded portions, said slots extending transversely across several of said threads, whereby the position of the reflector may be changed by small increments, as described.

5. A focusing device for a flashlight comprising a threaded metallic battery enclosing casing formed with a plurality of slots extending transversely across the threads, a threaded metallic reflector supporting cap, and struck-up portions between said slots on said casing which frictionally engage said threaded cap.

JAMES L. SHANNON.